(12) United States Patent
Dehmeshki

(10) Patent No.: US 7,697,742 B2
(45) Date of Patent: Apr. 13, 2010

(54) LESION BOUNDARY DETECTION

(75) Inventor: Jamshid Dehmeshki, London (GB)

(73) Assignee: Medicsight PLC (GB)

( * ) Notice: Subject to any disclaimer, the term of this patent is extended or adjusted under 35 U.S.C. 154(b) by 1353 days.

(21) Appl. No.: 10/935,159

(22) Filed: Sep. 8, 2004

(65) Prior Publication Data

US 2005/0286750 A1 Dec. 29, 2005

(30) Foreign Application Priority Data

Jun. 23, 2004 (GB) ................................ 0414081.0

(51) Int. Cl.
*G06K 9/00* (2006.01)

(52) U.S. Cl. .................. 382/131; 382/128; 382/132; 382/173; 382/209; 382/308; 382/298; 382/261; 382/197; 382/309; 382/169; 600/300; 600/443

(58) Field of Classification Search ............... 600/407, 600/300; 382/131, 128, 294, 132, 234, 252, 382/235, 218, 278, 133, 209, 179, 308, 171, 382/172, 173; 706/2
See application file for complete search history.

(56) References Cited

U.S. PATENT DOCUMENTS

| | | | |
|---|---|---|---|
| 5,185,809 A * | 2/1993 | Kennedy et al. ............ | 382/131 |
| 5,343,390 A | 8/1994 | Doi et al. | |
| 5,617,459 A | 4/1997 | Makram-Ebeid et al. | |
| 6,125,194 A | 9/2000 | Yeh et al. | |
| 6,138,045 A * | 10/2000 | Kupinski et al. ............ | 600/425 |
| 6,185,320 B1 * | 2/2001 | Bick et al. .................. | 382/132 |
| 6,654,728 B1 * | 11/2003 | Li et al. ...................... | 706/2 |
| 6,898,303 B2 * | 5/2005 | Armato et al. .............. | 382/131 |

(Continued)

FOREIGN PATENT DOCUMENTS

WO WO 00/10457 A1 3/2000

(Continued)

OTHER PUBLICATIONS

Region Growing: A New Approach; S. A. Hojjatoleslami and J. Kittler, IEEE 1998.*

(Continued)

*Primary Examiner*—Wesley Tucker
*Assistant Examiner*—Nancy Bitar
(74) *Attorney, Agent, or Firm*—Sterne, Kessler, Goldstein & Fox PLLC

(57) ABSTRACT

A method of detecting a junction between a lesion and a wall in a CT scan image may include determining the boundary (B) of the wall to an internal space (L), identifying critical points ($c_1$, $c_2$) along the boundary, and selecting one critical point at either side of the lesion as a junction point between the wall and the lesion. The critical points may be points of maximum local curvature and/or points of transition between straight and curved sections of the boundary. The critical points may be selected by receiving first and second seed points ($p_1$, $p_2$) at either side of the lesion, moving the seed points to the boundary if they are not already located on the boundary, and finding the closest critical points to the seed points. The seed points may be determined by displacing the determined junction points ($j_1$, $j_2$) from an adjacent slice of the image into the current slice.

29 Claims, 12 Drawing Sheets

U.S. PATENT DOCUMENTS

| | | | |
|---|---|---|---|
| 6,909,797 B2 | 6/2005 | Romsdahl et al. | |
| 7,324,104 B1 * | 1/2008 | Bitter et al. | 345/420 |
| 7,336,809 B2 * | 2/2008 | Zeng et al. | 382/128 |
| 2003/0099384 A1 | 5/2003 | Zeng et al. | |
| 2003/0099385 A1 | 5/2003 | Zeng et al. | |
| 2003/0099389 A1 | 5/2003 | Zeng et al. | |
| 2004/0064029 A1 * | 4/2004 | Summers et al. | 600/407 |
| 2004/0086161 A1 * | 5/2004 | Sivaramakrishna et al. | 382/131 |

FOREIGN PATENT DOCUMENTS

| | | | |
|---|---|---|---|
| WO | WO 02/085211 A2 | | 10/2002 |
| WO | WO 02/103065 A2 | | 12/2002 |
| WO | WO 03/024184 A2 | | 3/2003 |
| WO | WO2004/046995 | * | 6/2003 |
| WO | WO 03/070102 A2 | | 8/2003 |

OTHER PUBLICATIONS

Great Britain Search Report from Great Britain Appl. No. GB0414081.0, completed Oct. 19, 2004, 1 page.

"Lung Nodule Detection on Thoracic Computed Tomography Images: Preliminary Evaluation of a Computer-aided Diagnosis System," Gurcan M. et al., Med. Phys. 29(11), Nov. 2002, pp. 2552-2558.

* cited by examiner

LESION BOUNDARY DETECTION

BACKGROUND OF THE INVENTION

1. Field of the Invention

The present invention relates to a method of detecting the junction of a lesion and a wall, such as a lung nodule attached to pleura or a polyp attached to a colon wall, in an image scanned from a human or animal body, particularly but not exclusively in a computed tomography (CT) image. The invention encompasses software and apparatus for carrying out the method.

2. Background Art

Detection of suspicious lesions in the early stages of cancer can be considered the most effective way to improve survival. Lung nodule detection and polyp detection are some of the more challenging tasks in medical imaging.

Computer-assisted techniques have been proposed to identify regions of interest containing a nodule in a CT scan image, to segment the nodule from surrounding objects such as blood vessels or the lung wall, to calculate physical characteristics of the nodule, and/or to provide an automated diagnosis of the nodule, to provide some examples. Fully automated techniques perform all of these steps without intervention by a radiologist, but one or more of these steps may require input from the radiologist, in which case the method may be described as semi-automated.

Detection of the size or extent of a lesion is important for accurate diagnosis, but it is difficult to detect the extent of a lung nodule attached to the pleura, or to separate a nodule from the pleura, because of their similar intensity in CT scans. Likewise, it is difficult to detect the boundary between a polyp and the colon wall.

Patent publications US-A-2003/0099384 to Zeng et al., filed Sep. 30, 2002, and US-A-2003/0099389 to Zeng et al., filed Nov. 23, 2001, describe methods of detecting pleural nodules using morphological closing for small nodules, and a deformable surface model for nodules larger than the structural element used for morphological closing.

Patent publication WO 03/010102 and the article 'Lung Nodule Detection on Thoracic Computed Tomography Images: Preliminary Evaluation of a Computer-aided Diagnostic System', Gurcan M et. al., Med. Phys. 29 (11), November 2002, pp. 2552-2558, describe a method of detecting pleural nodules using a local indentation search next to the lung pleura by finding a pair of points on a closed contour along the boundary of the lung where the ratio of the distance between the points along the boundary is greater than the straight line distance between the two points by more than a predetermined threshold.

BRIEF SUMMARY OF THE INVENTION

A method of detecting a junction between a lesion and a wall in a scan image may comprise determining the boundary of the wall of an internal space, identifying critical points along the boundary, and selecting a critical point at either side of the lesion as a junction point between the wall and the lesion. For instance, the critical points may be points of maximum local curvature or points of transition between straight and curved sections of the boundary. According to an embodiment, the critical points may be selected by receiving first and second seed points at either side of the lesion, moving the seed points to the boundary if they are not already located on the boundary, and finding the closest critical points to the seed points. The seed points may be determined by displacing the selected junction points from an adjacent slice of the image into the current slice. p An advantage of this method is that the points of contact between the lesion and the pleura can be determined accurately in three dimensions, and the extent of the lesion can therefore be determined more precisely.

The location of the junction points may be fine tuned using various techniques. In some circumstances the location of the junction points may not coincide precisely with the determined critical points.

The present invention may be implemented using a computer, for example, and extends to software, firmware, and/or hardware for carrying out the method.

BRIEF DESCRIPTION OF THE DRAWINGS/FIGURES

DETAILED DESCRIPTION OF THE INVENTION

CT Image

A computed tomography (CT) image can be used to detect the junction of a lesion and a wall, such as a lung nodule attached to the pleura or a polyp attached to the colon wall. A CT image can include a plurality of slices, which are generally obtained from a CT scan of a human or animal patient. Each slice is a 2-dimensional digital grey-scale image of the x-ray absorption of the scanned area. The properties of the slice depend on the CT scanner used. For example, a high-resolution multi-slice CT scanner may produce images with a resolution of 0.5-0.6 mm/pixel in x and y directions (i.e., in the plane of the slice). Each pixel may have 32-bit grayscale resolution. The intensity value of each pixel is normally expressed in Hounsfield units (HU). Sequential slices may be separated by a constant distance along a z direction (i.e. the scan separation axis). For example, the sequential slices may be separated by a distance in a range of approximately 0.75-2.5 millimeters (mm). According to an embodiment, the scan image is a three-dimensional (3D) grey scale image, for example, with an overall size that depends on the area and/or number of slices scanned.

The present invention is not restricted to any specific scanning technique, and is applicable to electron beam computed tomography (EBCT), multi-detector or spiral scans or any technique which produces as output a 2D or 3D image representing X-ray absorption.

Figure 1:
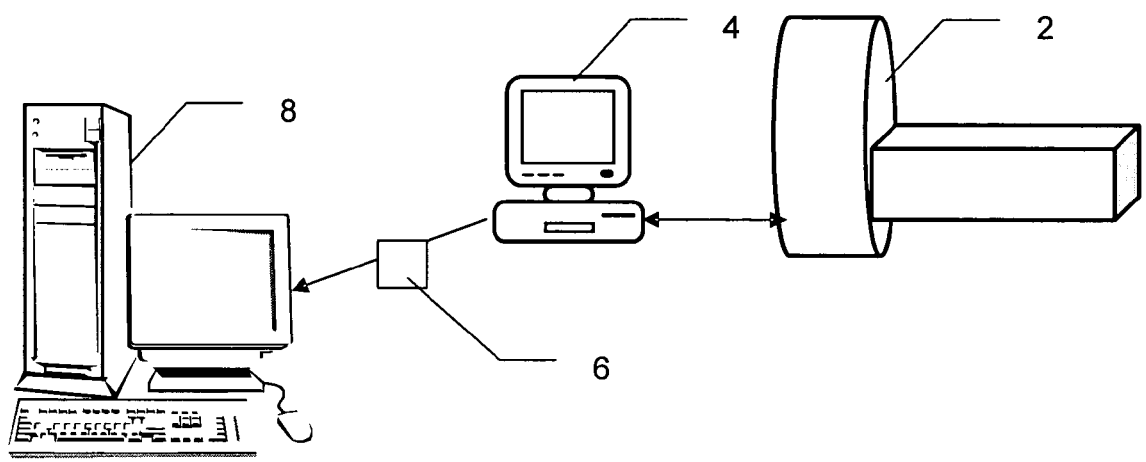
FIG. 1 is a schematic diagram showing a CT scanner and a remote computer for processing image data from the scanner according to an embodiment of the present invention.

As shown in FIG. 1, the scan image is created by a computer 4 which receives scan data from a scanner 2 and constructs the scan image. The scan image is often saved as an electronic file or a series of files which are stored on a storage medium 6, such as a fixed or removable disc. The scan image may be processed by the computer 4 to identify the extent of a lung nodule, or the scan image may be transferred to another computer 8 which runs software for processing the image as described below. The image processing software may be stored on a computer recordable medium, such as a removable disc, or downloaded over a network. Computer 4 can be any type of computer system, including but not limited to an example computer system 1900 described below with reference to FIG. 19.

Nodules Attached to Lung Wall

An embodiment may be designed for detection of a boundary between a nodule and a lung wall. Peripheral pulmonary nodules often exhibit some degree of attachment to the pleural surface (e.g., on the periphery of the lung, compressed against the external boundary of the thorax). The nodules share a significant amount of their surface with the pleura. For this reason, the delineation of the boundary between pleura and nodule is a difficult task. This complexity is reduced, according to an embodiment of the present invention, by taking as input two seed points on the periphery of the lung wall at opposing ends of the nodule. The seed points may be selected by a user, such as a radiologist, or determined automatically. The theory and implementation of the boundary delineation method is described below.

Figure 2:
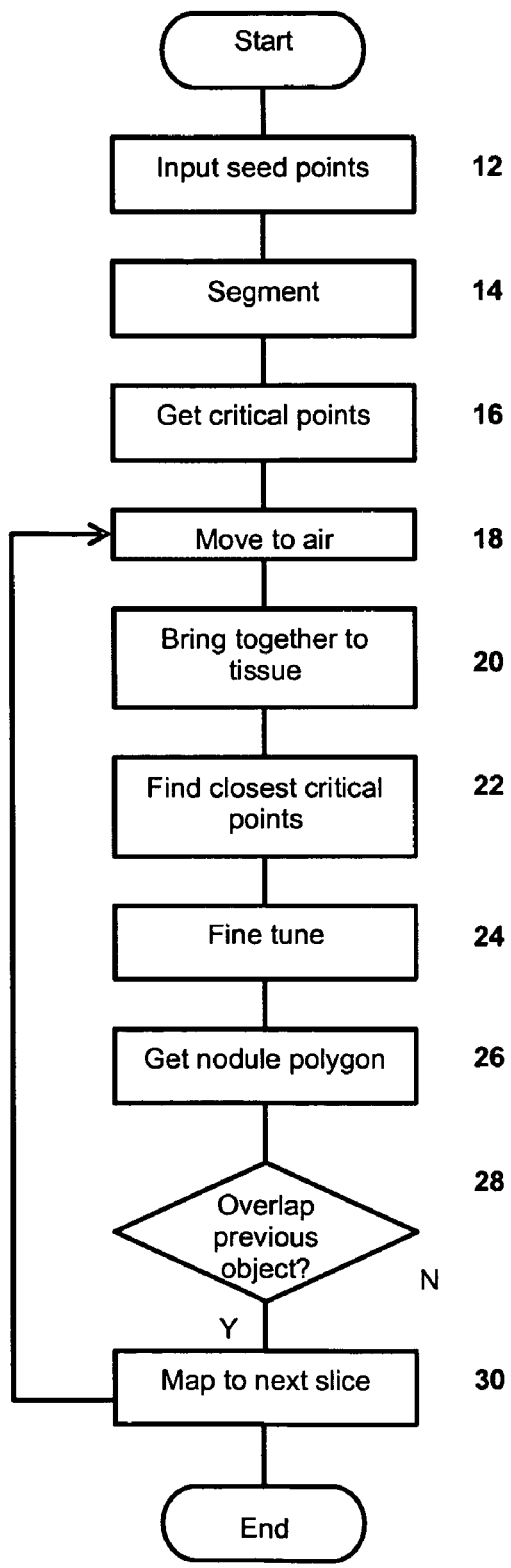
FIG. 2 is a flowchart of an algorithm according to an embodiment of the present invention.

In the embodiment of FIG. 2, a method comprises the following steps described in outline format:
1) Input the seed points (step 12).
2) Apply coarse segmentation to separate the lung from the surrounding tissue and determine the boundary (step 14).
3) Determine critical points on a contour (step 16).
4) For each slice (starting from the starting slice):
   a. If not at the starting slice and either of the current points are in the tissue, move the current points to the boundary (step 18). If this process fails, then terminate the process.
   b. If either point is in the lung space, move it towards the other point until it reaches the boundary (step 20)—terminate if failed.
   c. Find closest critical points along the contour to the current two points (step 22).
   d. Fine tune the points (step 24).
   e. Get outline of nodule (step 26) in the current slice.
   f. Check overlap with the nodule in the previous slice (step 28)—terminate if no overlap.
   g. If overlap, then map the two points to the next slice (step 30).
5) Repeat steps 18-30 for consecutive slices in both directions from the starting slice.

In an embodiment, the method including steps 12-30 can be implemented in image processing software on computer system 4. Each of the steps 12-30 outlined above is described in detail below with reference to FIGS. 3-18.

Input Seed Points

Referring to step 12, the user may inspect one or more slices of a CT scan and visually identify a potential pleural nodule. By means of a user input device, the user may select two seed points on either side of the potential pleural nodule on a slice. The seed points need only be located on either side of the pleural nodule, and need not be precisely on the boundary.

Alternatively, the user may draw a box or other shape around the potential pleural nodule, using the input device. The points of intersection between the shape and the pleura may be taken as the two seed points.

As another alternative, the scan image may be pre-processed to identify potential pleural nodules, and the seed points may be input from this pre-processing stage.

Segmentation

Referring to step 14, a sub-image of a plurality of slices (e.g., 30 slices) below and above the slice containing the seed points is selected. Coarse segmentation may be performed so as to separate the image into the lung space and the pleura (including any nodule attached to the pleura). The segmentation may be performed by applying a predetermined threshold to the image, because the intensity of the lung space is typically much lower than that of the pleura and nodules. Objects above the threshold but not connected to the pleura are not considered by this algorithm.

Alternatively, in order to make the implementation more reproducible, an optimum center slice may be found, and the sub-image may be centered on the optimum center slice. A window is chosen, centered on the mid point between the two seed points. For example, the window may have dimensions of 60 pixels×60 pixels×10 slices. The point with the maximum intensity within the window may be found, and the corresponding slice containing that maximum intensity point may be chosen as the center slice for the sub-image.

The segmentation may be further improved by performing an adaptive segmentation in response to the initial coarse segmentation. In the adaptive segmentation, the lung space obtained by coarse segmentation may be enlarged using a distance transform to obtain a mask containing the lung space and an envelope around the lung space. The enlargement factor may be 50%, for example. The adaptive segmentation is generally performed with a threshold that is derived only from the intensity values within the mask.

The result of the segmentation may be a binary map of the slice, with pixels representing the lung space having one binary value and pixels representing surrounding tissue having another binary value. Pixels on the boundary between the lung space and the surrounding tissue are generally referred to as boundary pixels, and may be labeled as such.

Figure 3A:
FIGS. 3a to 3c show respectively a single slice of a CT scan image of a lung, the lung area as obtained by segmentation, and the boundary of the lung area according to embodiments of the present invention.
Figure 3B:
Figure 3C:

As an example, FIG. 3a shows the scan image of a slice of a lung, while FIG. 3b shows the result of the segmentation. FIG. 3b is a binary image in which the lung space is white (binary 1) and the surrounding tissue is black (binary 0). FIG. 3c shows, in white, the boundary pixels derived from the segmentation.

Determine Critical Points

Referring to step 16, as a preliminary step for detecting the junction between a nodule and the pleura, critical points on the boundary may determined. According to an embodiment, each section of the boundary is identified as concave, convex, or straight. A critical point is usually either a point of maximum convexity or concavity, or a transitional point between the states of concave, convex, or straight. For instance, the critical point may be between straight and convex or concave, or between convex and concave. Critical points can indicate a boundary between the pleura and a nodule.

A method of determining critical points will now be described. The input may be a map of the boundary contour. For example, the map of the coundary contour can be a binary array in which x and y coordinates of a pixel represent a position of the pixel within the array, and boundary pixels are generally flagged as binary 1. For instance, the map may be a bitmap of the boundary.

Next, a boundary pixel may be selected as the starting point. Any suitable boundary pixel may be used as the starting point. For example, the starting point may be the first boundary pixel found in a raster scan (left to right, top to bottom) of the bitmap of the boundary.

The algorithm may progress along the boundary, recording the angle between successive neighboring boundary pixels. As the pixels of each slice are arranged in 2D Cartesian coordinates, 8 possible angles may be provided. For each pixel, the neighbors can be represented on a grid:

| Pixel (x − 1, y − 1) | Pixel (x, y − 1) | Pixel (x + 1, y − 1) |
| Pixel (x − 1, y)     | Pixel (x, y)     | Pixel (x + 1, y)     |
| Pixel (x − 1, y + 1) | Pixel (x, y + 1) | Pixel (x + 1, y + 1) |

The angle between each pixel and its neighbors can be encoded as follows:

| 7 | 0           | 1 |
| 6 | Pixel (x,y) | 2 |
| 5 | 4           | 3 |

Where the codes correspond to the following angles:

|       | Code |     |    |    |     |     |     |     |
|-------|------|-----|----|----|-----|-----|-----|-----|
|       | 0    | 1   | 2  | 3  | 4   | 5   | 6   | 7   |
| Angle | 180  | 135 | 90 | 45 | 360 | 315 | 270 | 225 |

The bitmap may be converted to a chain code comprising a one-dimensional vector of codes representing the angle between successive neighboring boundary pixels in a loop around the boundary, e.g. (1,1,1,2,1,3,3 . . . ). Note that these are absolute angles relative to a downwards direction.

The chain code may be converted to an angle of curvature of the boundary at each boundary pixel. This may be done by taking the chain codes around each boundary pixel and applying a weighted filter so that the chain codes for boundary pixels closer to the current boundary pixel are more heavily weighted. The angle of curvature is relative to the boundary rather than an absolute angle. For instance, chain codes preceding the current pixel around the loop may be subtracted from those following the current pixel around the loop.

In one example, the angle of curvature for boundary pixel i is calculated as follows:

$$\alpha_i = \frac{\sum_{j=-n}^{n} m_j cc_{i+j}}{\sum_{j=-n}^{n} |m_j|}$$

where $m_j$ is the weighting factor, which may follow a Gaussian distribution; $cc_{i+j}$ is the chain code for pixel (i+j), and are negative for negative j; and n represents the number of pixels taken into account in each direction around the boundary. For example, n may equal 5.

The result can be a one-dimension vector representing the angle of curvature of the boundary at each boundary pixel. For instance, the one-dimensional vector may take into account nearby pixels in either direction around the boundary. The effect of the weighted filter is to smooth the angles from the discrete, granular values of the chain codes.

The local maxima and minima of the angles of curvature may be identified. For example, a neighborhood comparison method may be used in which each angle is compared with a predetermined number (e.g. 3) of preceding and following angles in the vector.

To identify the transitional points between straight and concave or convex, a range of angles corresponding to 'straight' may be defined. For example, all angles of 180°±$f$ may be classified as straight.

Figure 4A:
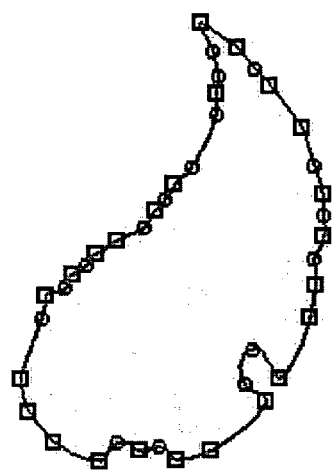
FIGS. 4a to 4c show critical points detected on the lung boundary with three different thresholds according to embodiments of the present invention.
Figure 4B:
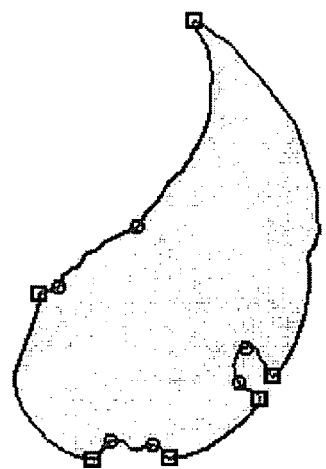
Figure 4C:
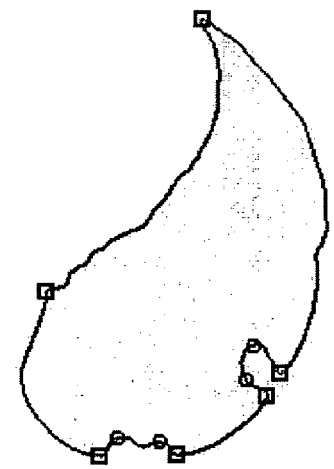

FIGS. 4a to 4c show the critical points for $f$=5, 15 and 30° respectively. Concave maxima and transitions between straight and concave are labeled with squares, while points of maximum convexity or transitions between straight and convex are labeled with circles. FIG. 4a shows that setting $f$ too low results in a large number of critical points representing only slow transitions in the curvature of the boundary. The value of $f$ may be predefined in the software, and/or adjustable by the user.

Finding the Nodule Direction

Figure 5:
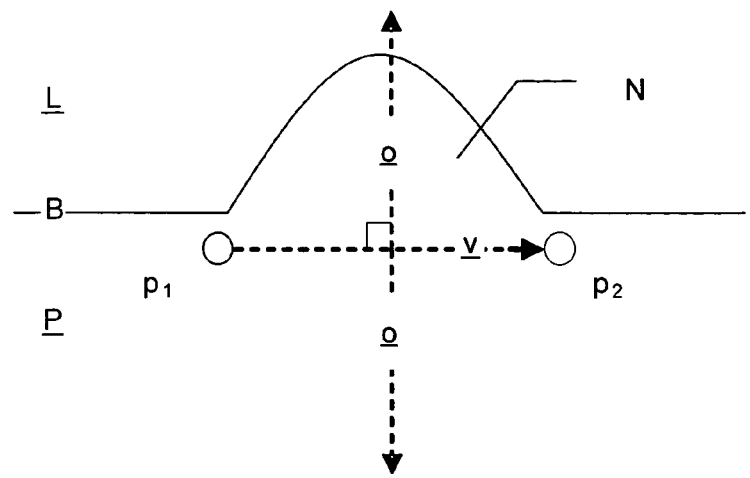
FIG. 5 shows seed points at either side of the nodule according to an embodiment of the present invention.

A determination may be made as to which direction, relative to the two seed points $p_1$ and $p_2$, the nodule extends into the lung. In one embodiment, as illustrated in FIG. 5, a vector v is formed between the two points $p_1$ and $p_2$, and an orthogonal vector o is constructed from the midpoint of the vector v in both directions. The direction of o which falls into the lung space L indicates the direction of the lung and therefore the direction in which the pleural nodule N extends into the lung from the pleura P. The nodule direction may be determined from the direction of the detected nodule in the previous slice, relative to the seed points $p_1$ and $p_2$.

Move to Air

Referring to step 18, for each slice, the seed points $p_1$ and $p_2$ are generally checked to determine whether they are on the boundary B, and if not, they can be moved to a suitable point on the boundary. In the initial slice, the user need not necessarily position the seed points $p_1$ and $p_2$ precisely on the boundary. After moving the seed points to the boundary, and moving the seed points to the next slice, by changing their z coordinates, the seed points may no longer be on the boundary in the new slice.

If either of the seed points $p_1$ and $p_2$ is within the pleura P, that point is typically moved onto the boundary B. The direction and distance of movement may be limited to avoid moving away from a critical point likely to represent an interface between the nodule and the pleura, for example. Generally, the angle of the interface is unlikely to change greatly from one slice to the next. One technique for moving seed points from the tissue to the boundary will now be described.

Figure 6:
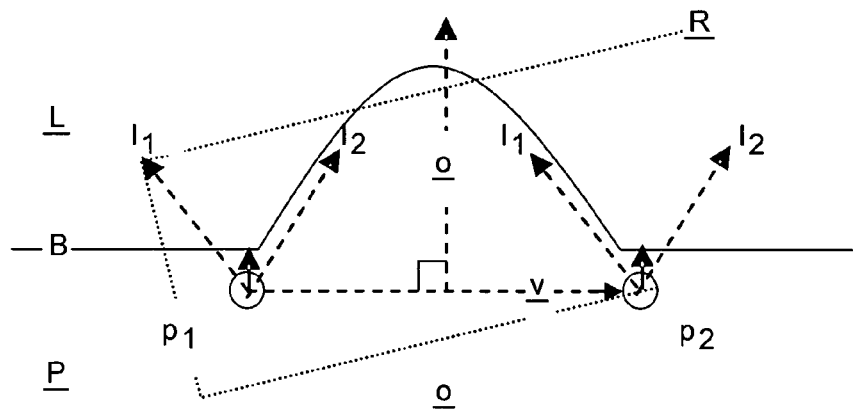
FIG. 6 illustrates a method of moving the seed points from the pleura to the boundary according to an embodiment of the present invention.

First, check whether there is any lung space L in a 20 mm×20 mm window centered on the seed point to be moved. If there is not, then an error condition may be indicated. If there is, then the following steps are performed, as shown in FIG. 6:

Draw two lines $l_1$, $l_2$ from each of the points $p_1$, $p_2$ which are in the tissue, at 45 and 135 degrees respectively from the vector v, in the direction o of the nodule N, each of 10 units in length.

Get the minimum size rectangle R from the seed point to be moved to the ends of the two lines $l_1$, $l_2$ (note that there may only be one pair of such lines if one of the points $p_1$, $p_2$ is not in the tissue);

Find the nearest point to the seed point on the boundary B, within the rectangle R.

Move the point to that boundary point provided that the distance moved is less than 10 mm.

This technique applies a suitable restriction on the angle by which the vector v can rotate and the distance by which the seed points can move.

Bring Two Points Together

Figure 7:
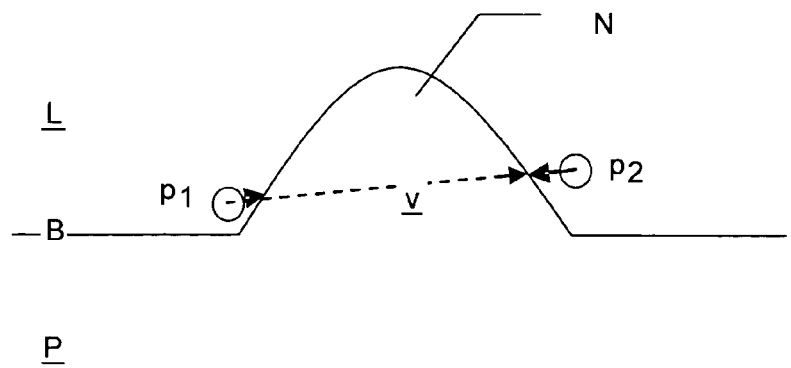
FIG. 7 illustrates a method of moving the seed points from the lung space to the boundary according to an embodiment of the present invention.
Figure 8:
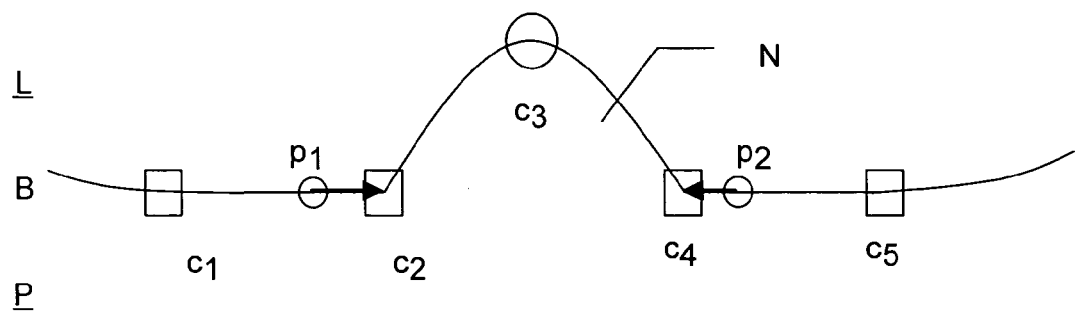
FIG. 8 illustrates a method of moving the seed points to the closest critical points according to an embodiment of the present invention.

Referring to step 30, if either of the two seed points $p_1$ and $p_2$ are in the lung space L, that point can be moved toward the other point until it reaches the boundary B, as shown in FIG. 7. The process may be terminated if the moved points are within a predetermined distance (e.g., 2 mm) from each other. For instance, having the moved points within a certain proximity of each other can indicate that there is only air between the points.

Find Closest Critical Points

Referring to step 22, the seed points $p_1$ and $p_2$ both can be on the boundary B. The seed points $p_1$ and $p_2$ may be moved to the closest critical points along the boundary B. According to an embodiment, satisfaction of at least one condition may be required to avoid a poor choice of critical point, as explained in more detail below.

For each seed point, the closest critical point can be determined along the boundary B in either direction. If the critical point in one direction along the boundary is significantly closer than the critical point in the other direction, then the seed point is generally moved to the closer critical point. For example, if the distance between the seed point and the closest critical point in one direction is greater than a threshold, the seed point may be moved to the closest critical point in the other direction. The threshold may be a function of the distance between the seed point and the closer of the two closest critical points in either direction. For example, the threshold can be twice the distance between the seed point and the closer of the two closest critical points in either direction.

Figure 9:
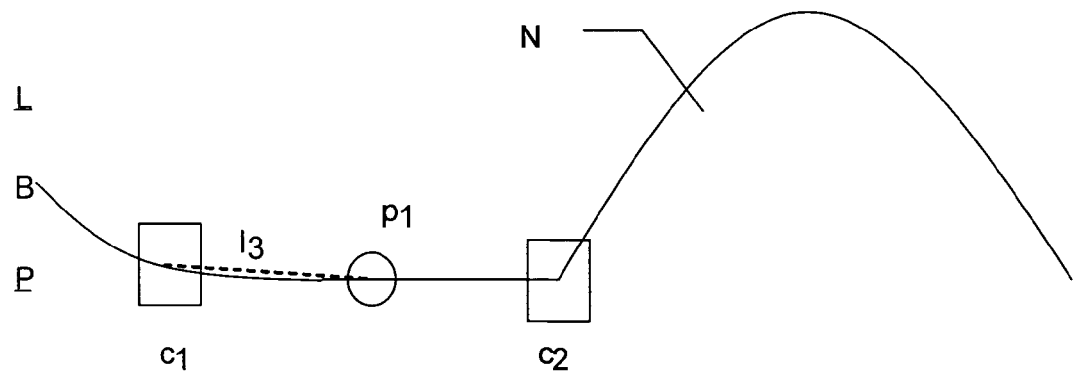
FIG. 9 illustrates a method of determining the best critical point when they are approximately equidistant according to an embodiment of the present invention.

If the closest critical points in either direction are approximately equidistant, a critical point can be chosen based on the amount of lung space in a straight line between the seed point and each critical point. For example, as shown in FIG. 9, if the difference between the distances between the seed point $p_1$ and the two closest critical points $c_1$, $c_2$ along the boundary B is less than the threshold, then a line $l_3$ can be drawn from the seed point $p_1$ to each of the two closest critical points $c_1$, $c_2$, and the proportion of the line length which passes through the lung space L can be determined. If the proportion is more than 20%, for example, then the critical point may be considered a bad choice. For instance, the seed point may be moved to the closest critical point $c_2$ in the other direction, if the proportion for that critical point is less than or equal to 20%. In this example, if both critical points have a proportion of greater than 20%, then the seed point typically is not moved to either critical point.

Moving the Points if too Close

There are cases when one of the seed points might be relatively far from the best critical point. For instance, when finding the closest critical point, both seed points can be moved to the same critical point, or to critical points very close to each other. This may happen when the seed points are mapped from a previous slice and especially when fine segmentation movement is applied, as will be described below. If the distance between the two seed points along the boundary is less than a threshold distance, such as 5 mm, the seed point closer to the critical point is often moved to that critical point. The other seed point can be moved along the boundary to the nearest critical point away from the other seed point. For example, the other seed point is generally moved to the nearest critical point away from the other seed point, provided that the distance between the two seed points does not increase beyond a predetermined threshold, such as the original distance between the seed points. The distance between the seed points after moving one away typically is not more than double the distance before moving away.

No Critical Point Nearby

In some cases there is no critical point near either of the seed points, which may cause a seed point to move to the closest critical point to the another seed point, for example. According to an embodiment, this can be avoided by preventing a seed point from being moved along the boundary by more than half the distance between the seed points before moving. In this embodiment, the seed point far away from any critical point is generally not moved.

Fine Segmentation

Referring to step 24, after finding the nearest critical points using the coarse segmented boundary, the movement of the seed points may be fine tuned by re-evaluating the boundary B in the vicinity of the seed points using fine segmentation, which is often dependent on the local contrast. For example, the threshold for determining whether each point is foreground or background may be determined by the intensities of points within a mask of local points of predetermined extent surrounding that point. The threshold may be selected so that the mean of the centroids of intensities above and below the threshold is equal to the threshold, or offset from the threshold by a predetermined amount.

The critical points on the fine-segmented boundary can be determined. For instance, the seed points may be moved to the closest critical point on the fine segmented boundary. According to an embodiment, the seed points are moved subject to conditions. Three exemplary conditions are set forth below:

the movement of the seed points to the fine-segmented boundary is always away from the direction of nodule.

the distance moved must be less than a predetermined threshold. The threshold is set according to how much the seed point was moved from its initial point within the slice to its final point using coarse segmentation.

the angle by which the line between the seed points rotates when moving to the fine segmented boundary critical points must be less than a predetermined angle, such as 40 degrees.

The three exemplary conditions set forth above are for illustrative purposes, and are not intended to limit the scope of the present invention. Any suitable conditions may be provided.

The coarse segmented boundary might not be near the fine-segmented boundary of the nodule where there can be a strong partial volume effect. In this case the nearest critical point may be away from the nodule. For instance, only movement away from the nodule may be allowed. The correct critical points may not be determined. In an embodiment, if the seed points are in the lung relative to the fine-segmented boundary, the closest critical points on the fine-segmented boundary can be determined by moving the seed points toward each other until they reach the boundary.

Fine-segmentation can be used to remove the effect of material around the nodule, such as infected tissue, which may obscure the junction of the nodule to the pleura, for example. Coarse segmentation normally includes the material as part of the boundary, whereas fine segmentation usually reclassifies the material as background.

Multiple Boundaries

Figure 10:
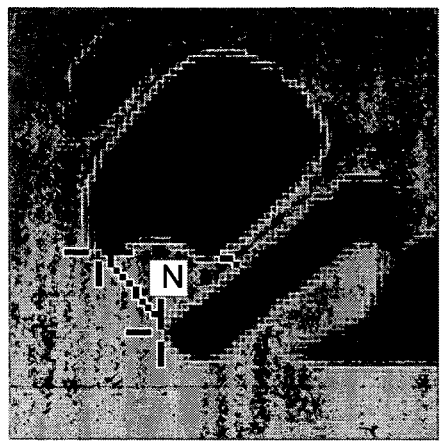
FIG. 10 is an exemplary illustration in which a lung is divided into multiple boundaries according to an embodiment of the present invention.

In some cases, the lung L is split into two or more parts by the coarse segmentation, and the seed points are located in different parts, as illustrated for example in FIG. 10. This can occur when a blood vessel extends across the lung in the current slice, and may cause difficulties in determining the extent of the nodule N by including the blood vessel as part of the nodule N.

Figure 11:
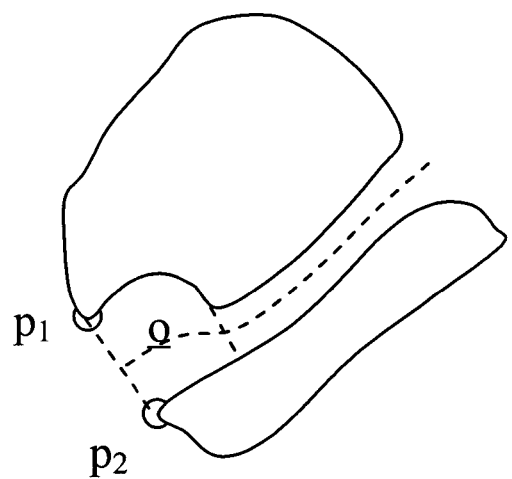
FIG. 11 is an exemplary illustration in which a join between boundaries is determined according to an embodiment of the present invention.
Figure 12:
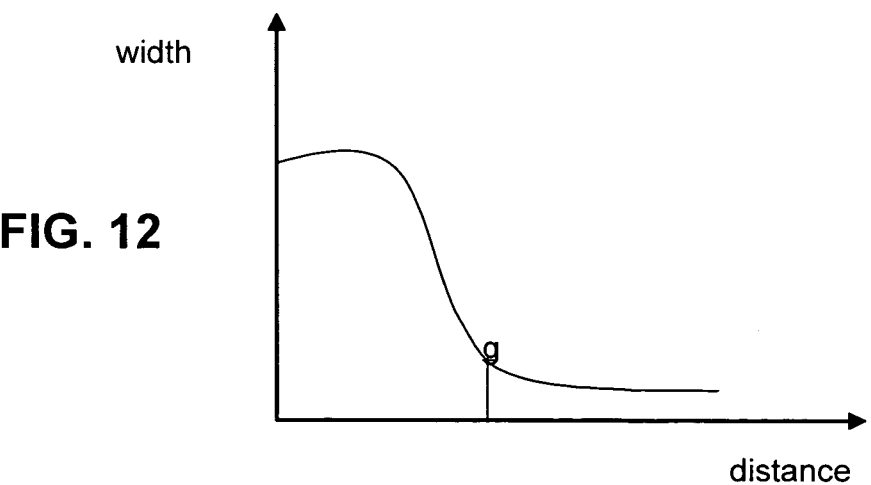
FIG. 12 is a graph of width versus distance with respect to a line midway between the boundaries shown in FIG. 11 according to an embodiment of the present invention.

To overcome this problem, a determination can be made as to whether the seed points, when moved to the boundary B, form part of different, unconnected boundaries. If so, the variation of the distance between the two boundaries may be determined in the direction o of the nodule with respect to a location between the seed points, as shown in FIG. 11. A sample graph of the variation of the distance is shown in FIG. 12. The point g of greatest change in the gradient of the graph may be determined. For instance, the boundaries B can be joined at point g, which can allow the nodule N to be separated from the blood vessel in an embodiment.

Contour Correction

Figure 13A:
FIGS. 13a to 13d show a method of correcting overshot edges of a nodule according to an embodiment of the present invention.

In some cases the boundary between the detected junction points has its edges overshot, as shown for example in FIG. 13a. For instance, slow angular changes at the junction can cause the critical points to be at locations different from the location of the nodule attachment to the lung wall.

Figure 13B:
Figure 13C:
Figure 13D:

A contour correction function can be used to re-adjust the junction points to allow correct region extraction, as shown in FIGS. 13b to 13d. A line may be drawn between the junction points. If the line intersects the boundary, then one junction point can be moved toward the other along the boundary until there is no intersection with the boundary on that side. Then the other junction point can be moved toward the first junction point until the line no longer intersects the boundary.

Figure 14A:
FIGS. 14a to 14d show a method of correcting overshot edges of a nodule where the detected edges lie beyond the nodule according to an embodiment of the present invention.
Figure 14B:
Figure 14C:
Figure 14D:

In some cases, particularly when the nodule is small, the line between the junction points when the edges are overshot does not intersect the boundary, as shown in FIG. 14a. In this case, the junction points can be moved together along the boundary, as shown in FIG. 14b. For instance, the junction points may be moved alternately by a small increment until the line intersects the boundary, as shown in FIG. 14c. The algorithm can proceed until the line no longer intersects the boundary, as shown in FIG. 14d.

Get Nodule Boundary

Referring to step 26, two junction points generally have been determined. These two junction points typically represent the points along the boundary B at which the nodule N joints the pleura P. These junction points can allow us to estimate the boundary of the nodule N within the slice. As a first approximation, the straight line joining the junction points may define the junction between the nodule N and the pleura P, though the scope of the present invention is not limited in this respect. For instance, a curved line may be used. The curvature of the curved line may be estimated from the curvature of the pleura surrounding the nodule N.

Figure 15:
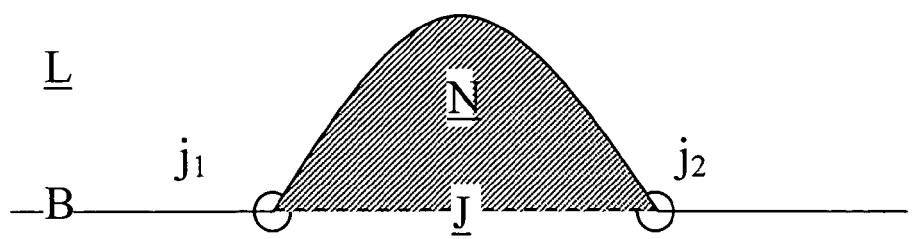
FIG. 15 shows a detected extent of a nodule according to an embodiment of the present invention.

In a first embodiment, an approximation may be made that the nodule N is not attached to or proximate to any features other than the pleura P. The result of the segmentation step may be used to identify all of the foreground region beyond the line joining the junction points as forming part of the nodule N, as shown in FIG. 15.

Figure 18:
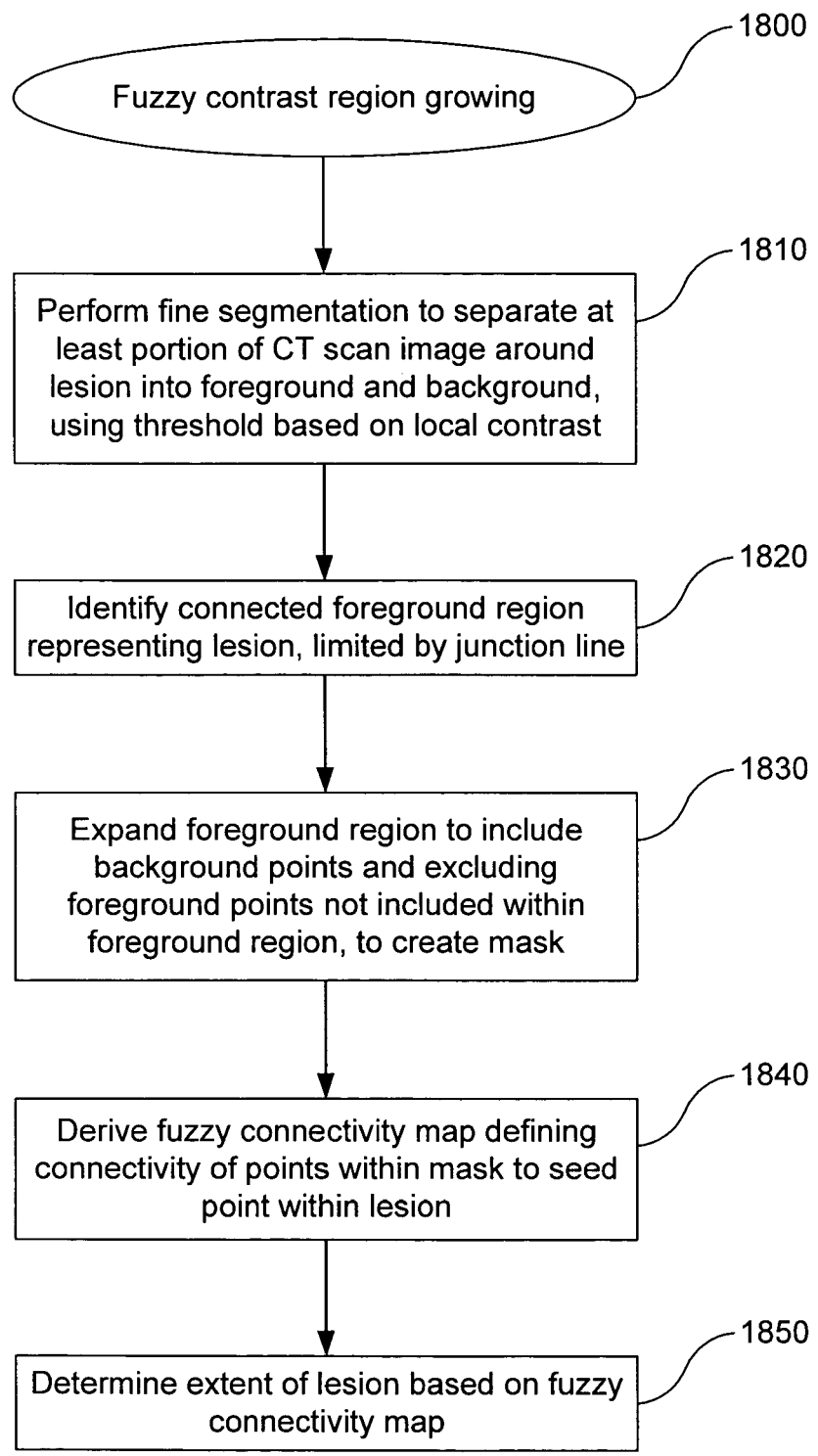
FIG. 18 is a flowchart of a method of growing a fuzzy contrast region according to an embodiment of the present invention.

In a second embodiment, and referring to FIG. 18, a fuzzy contrast region growing scheme 1800 may be used to identify the boundary of the nodule N. A rough estimate of the extent of the nodule N may be obtained by means of a local threshold-based segmentation process at block 1810. A local mask may be used to derive a threshold intensity value for each point. The threshold typically is sensitive to the local contrast and usually can distinguish low contrast nodules from their background. The nodule area N acquired by fine segmentation may include 'holes', i.e. background pixels surrounded by foreground pixels. The holes can occur based on the sensitivity of the fine segmentation to small local differences in contrast. A hole-filling algorithm may be used to fill such holes. For instance, the hole-filling algorithm may convert the holes to foreground pixels. Any suitable hole-filling algorithm may be used.

Figure 16:
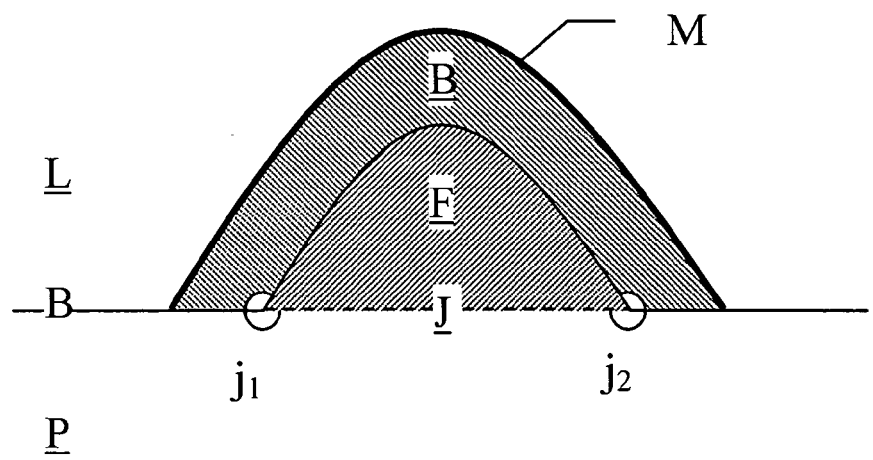
FIG. 16 illustrates a method of detecting an extent of a nodule according to an embodiment of the present invention.

The pixel having the highest intensity within the nodule area N is generally taken as a seed point. Binary region-growing can be performed from that seed point to identify a connected foreground region F at block 1820. The connected foreground region may be enlarged at block 1830 using a distance transform method, for example, to obtain a mask M containing both foreground and background. The enlargement factor may be 50%, for example. As shown in FIG. 16, the mask M may not include pixels on the other side of the line joining the junction points, including a projection of that line beyond the junction points. The foreground pixels segmented by the fine segmentation process that are not part of the connected foreground region F typically are removed from the mask M. The background pixels of the mask M may be labeled as the background region B.

The mean and the standard deviation of the intensity and gradient distributions of the foreground and background regions F and B may be determined. The mean of the background intensity $\mu_B$, the mean of the foreground intensity $\mu_F$, the standard deviation of the background intensity $\sigma_B$ and/or the standard deviation of the foreground intensity $\sigma_F$ may be calculated. A parameter $\epsilon$ can be estimated by counting the number of the foreground standard deviations $\sigma_F$ that the seed point is away from the background mean intensity $\mu_B$. The background mean intensity $\mu_B$ can be a measure of the contrast, which is often used in constructing a fuzzy map as described below.

A fuzzy object extraction technique may be used to define a 2D map of fuzzy connectivity of each pixel within the mask M with respect to the seed point. A fuzzy affinity function between adjacent pixels can be defined. The fuzzy connectivity between each pixel and the seed point may be derived at block 1840 by finding the affinity along a path between the pixel and the seed point, for example. The extent of the nodule N can be determined at block 1850 based on the fuzzy connectivity map.

The fuzzy connectivity between two points (not necessarily adjacent) can be obtained by considering the path with the strongest affinity between two points. The path with the strongest affinity is generally chosen as the best path. The strength of each path may be equal to that of the weakest affinity of adjacent points along the path. The strength between two adjacent points can be the affinity between those points.

The affinity between two pixels may be a measure of the probability that the pixels belong to the same object. This probability can be a function of closeness (i.e. Euclidian distance) and the similarity of the image features (i.e. intensity) between those pixels, to provide some examples.

The general model for fuzzy affinity can be given by:

$$\mu_k = (c,d) = h(\mu_a(c,d), f(c), f(d), c, d)$$

where h is a scalar value with range [0,1], c and d are image locations of two pixels, and f(i) is the intensity of spel i. $\mu a$ is an adjacency function based on distance between two pixels which may be given by, $$\mu_a(c,d) = \begin{cases} 1, & \text{if } \sqrt{\sum_{i=1}^{2}(c_i - d_i)^2} \leq 1 \\ 0, & \text{otherwise} \end{cases}$$

A simplified shift invariant version can be defined as $$\mu_k(c,d) = \mu_a(c,d)\lfloor \omega_i h_i(f(c),f(d)) + \omega_g(1.0 - h_{gk}(f(c),f(d))) \rfloor$$

if $c \neq d$, and $$\mu_k(c,c) = 1$$

where the subscripts 'i' represents the calculations related to intensity and 'gk' represents the calculations related to gradient values in relevant direction (which could be x, y, z) respectively. $\omega_i$ and $\omega_g$ are free parameter weight values whose sum is 1. The value of 0.9 for $\omega_i$ and 0.1 for $\omega_g$ can be chosen to allow intensity similarity to have more effect. The fuzzy affinity that was used for the current function is:

$$h_i(f(c), f(d)) = e^{-\frac{[(1/2)(f(c)+f(d))-m_i]^2}{(S_d)^2}}$$

$$h_{gx}(f(c), f(d)) = e^{-\frac{[(|f(c)-f(d)|/dx)-m_{gx}]^2}{(S_{gx})^2}}$$

$$h_{gy}(f(c), f(d)) = e^{-\frac{[(|f(c)-f(d)|/dy)-m_{gy}]^2}{(S_{gy})^2}}$$

where $m_i$, $s_i$, $m_g$ and $s_g$ are the Gaussian parameters for the intensity and gradient. These can be predefined or estimated from a small region around the seed point as described below.

The mean and standard deviation $\sigma$ of the intensity and gradient can be calculated over all points within the mask M. The parameters related to the gradients are typically computed in three directions (x, y and z) separately. The corresponding $\sigma$ can be calculated based on the difference between maximum and minimum gradient.

The calculation of the statistics is now described in more detail. The parameter $m_i$ may be taken as the intensity of the seed. The parameters $m_{gx}$ and $m_{gy}$ may be taken as the means of the gradients in x- and y-directions, respectively. The parameters $S_{gx}$ and $S_{gy}$ are the standard deviations of the gradients in their respective directions.

The standard deviation ($S_d$) appearing in the affinity expression may affect the formation of the fuzzy map and hence the determination of the boundary of the nodule. If the standard deviation $S_d$ is too big, the affinity curve may be relatively flat. For instance, the background region may have higher affinity and/or region growing may result in over-segmentation. If the standard deviation $S_d$ is too small, the shape of the affinity curve may be narrow, the foreground may have less affinity with the seed, and/or the result may be under-segmented. The curve can be spread to such an extent that the background has minimal but finite affinity with the seed. This information can be used to expand/limit the affinity Gaussian curve by modifying the standard deviation.

A fuzzy map may be constructed by finding the fuzzy connectivity value for each pixel relative to the seed point. This map may be considered as an enhanced image whose fuzzy connectivity values represent how strongly the respective pixels are attached to the seed point.

Contrast based region growing may be applied to the fuzzy map. Region growing can be performed on the fuzzy map, starting from the seed point, for example. As each pixel is added to the region during region-growing, the peripheral contrast between the internal and external boundaries of the region may be calculated. The peripheral contrast of the region may be defined as the difference between the average grey level of the internal boundary and average grey level of the current boundary.

At each iteration of the contrast-based region growing, one pixel, for example, may be selected from the current boundary and added to the current region. The selection priority of pixels in the current boundary can be determined based on the respective intensities of the pixels and/or the distance to the center of the current region. The peripheral contrast between the internal and external boundaries of the region may be calculated. The peripheral contrast of the region may be defined as the difference between the average grey level of the internal boundary and the average grey level of the current boundary. The peripheral contrast at each stage can be recorded. For instance, a memory can store the peripheral contrast. Region growing can continue until the region fills the mask M. The highest peripheral contrast value obtained during region growing generally indicates the optimum region. The optimum region often has a boundary that corresponds with the boundary of the nodule N.

Map to Next Slice

Referring to step 28, in response to determining the extent of the nodule N in the current slice, a determination can be made as to whether the nodule N in the current slice overlaps the determined extent of the nodule N in the previous, adjacent slice. This may be done in a variety of ways. For example a circular 'core' of a predetermined radius surrounding the center of the nodule N in each slice may be determined. A determination can be made as to whether the cores of adjacent slices overlap. For instance, the cores can overlap if pixels of adjacent cores have the same x and y coordinates. If there is no overlap, or no nodule has been detected in the current slice, this is taken to indicate the limit of the nodule N in the current direction from the starting slice. If the algorithm has proceeded in only one direction from the starting slice, it generally proceeds in the other direction in response to encountering the limit of the nodule N. If nodule boundary detection has been performed in both directions, then the algorithm typically outputs the detected extent of the nodule in each of the slices in which the nodule N has been detected.

Figure 17:
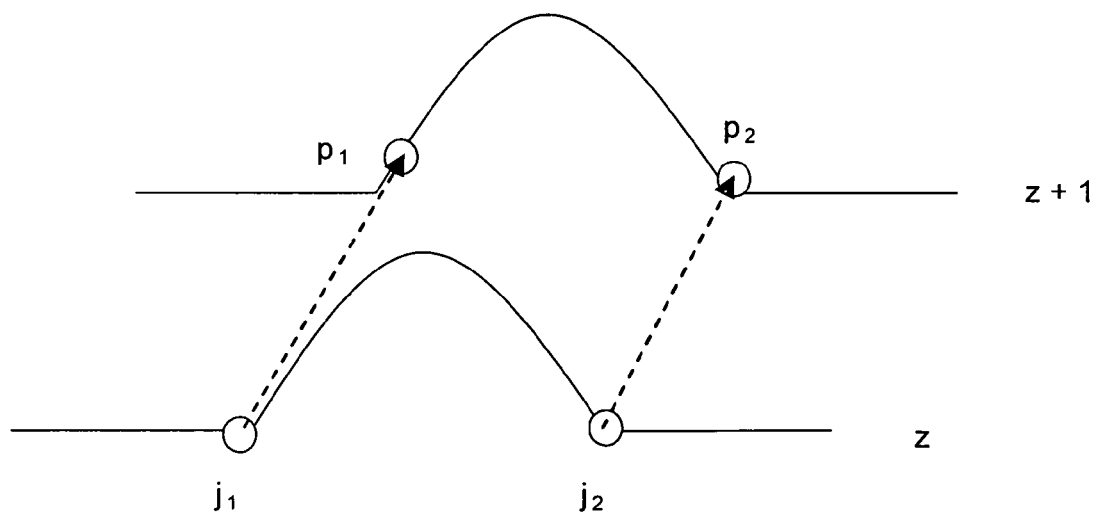
FIG. 17 illustrates mapping of junction points to seed points in an adjacent slice according to an embodiment of the present invention.

Referring to step 30, if the current slice overlaps with the previous slice, the algorithm usually proceeds to the next slice, using the junction points $j_1$, $j_2$ from the current slice as the two input seed points $p_1$, $p_2$ for the next slice, as shown in FIG. 17. For example, the seed points for the new slice generally have the same x and y coordinates as the junction points for the previous slice.

Results

Figure 19:
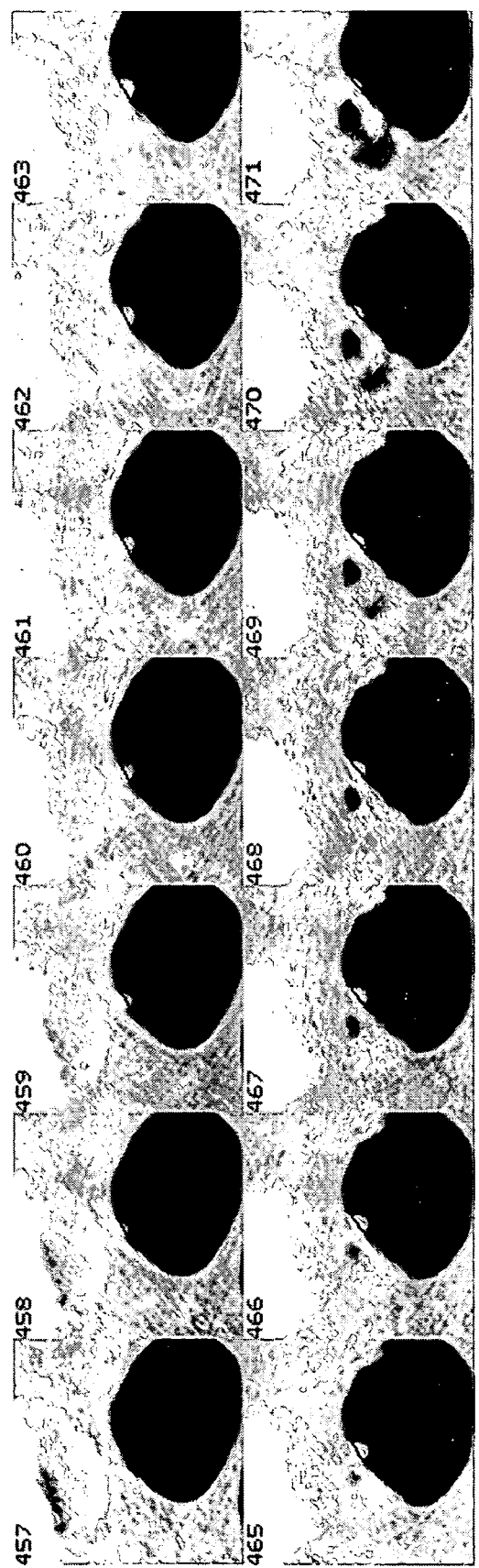
FIG. 19 shows a detected extent of a nodule in a sequential series of slices according to an embodiment of the present invention.

FIG. 19 shows the detected extent of the nodule N in a sample scan image.

Applicability to the Colon

The embodiment described above can also be applied to the detection of polyps in a CT scan image of the colon. Polyps can be attached to the colon wall, which has a similar intensity in the CT scan image. Although the shape of polyps is somewhat different from that of lung nodules, the junction between the colon wall and the polyp has similar geometrical properties, and the embodiment may be used to detect that junction.

Embodiments of the present invention may be applied to the detection of other growths attached to walls of internal spaces of the human and/or animal body. For instance, an abnormal growth attached to a wall of any suitable internal space of a human or animal body can be detected using embodiments of the present invention.

Example Computer System

Figure 20:
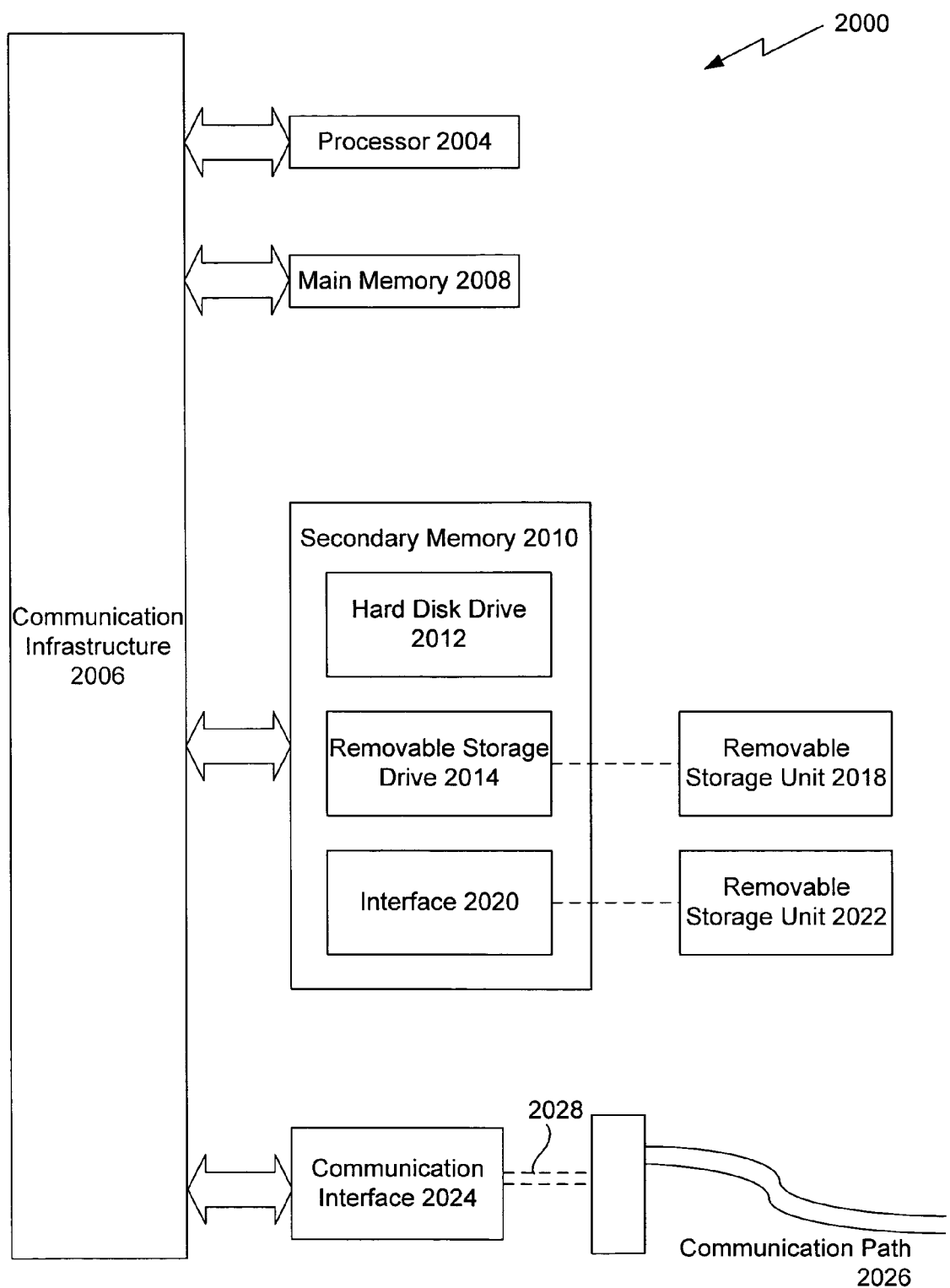
FIG. 20 illustrates an example computer system 2000, in which the present invention may be implemented as programmable code, according to an embodiment of the present invention.

FIG. 20 illustrates an example computer system 2000, in which the present invention may be implemented as programmable code. Various embodiments of the invention are described in terms of this example computer system 2000. After reading this description, it will become apparent to a person skilled in the art how to implement the invention using other computer systems and/or computer architectures.

The computer system 2000 includes one or more processors, such as processor 2004. Processor 2004 may be any type of processor, including but not limited to a special purpose or a general purpose digital signal processor.

The processor 2004 is connected to a communication infrastructure 2006 (for example, a bus or network). Various software implementations are described in terms of this exemplary computer system. After reading this description, it will become apparent to a person skilled in the art how to implement the invention using other computer systems and/or computer architectures.

Computer system 2000 also includes a main memory 2008, preferably random access memory (RAM), and may also include a secondary memory 2010. The secondary memory 2010 may include, for example, a hard disk drive 2012 and/or a removable storage drive 2014, representing a floppy disk drive, a magnetic tape drive, an optical disk drive, etc. The removable storage drive 2014 reads from and/or writes to a removable storage unit 2018 in a well known manner. Removable storage unit 2018, represents a floppy disk, magnetic tape, optical disk, etc. which is read by and written to by removable storage drive 2014. As will be appreciated, the removable storage unit 2018 includes a computer usable storage medium having stored therein computer software and/or data.

In alternative implementations, secondary memory 2010 may include other similar means for allowing computer programs or other instructions to be loaded into computer system 2000. Such means may include, for example, a removable storage unit 2022 and an interface 2020. Examples of such means may include a program cartridge and cartridge interface (such as that found in video game devices), a removable memory chip (such as an EPROM, or PROM) and associated socket, and other removable storage units 2022 and interfaces 2020 which allow software and data to be transferred from the removable storage unit 2022 to computer system 2000.

Computer system 2000 may also include a communication interface 2024. Communication interface 2024 allows software and data to be transferred between computer system 2000 and external devices. Examples of communication interface 2024 may include a modem, a network interface (such as an Ethernet card), a communication port, a Personal Computer Memory Card International Association (PCMCIA) slot and card, etc. Software and data transferred via communication interface 2024 are in the form of signals 2028 which may be electronic, electromagnetic, optical, or other signals capable of being received by communication interface 2024. These signals 2028 are provided to communication interface 2024 via a communication path 2026. Communication path 2026 carries signals 2028 and may be implemented using wire or cable, fiber optics, a phone line, a cellular phone link, a radio frequency link, or any other suitable communication channel. For instance, the communication path 2026 may be implemented using a combination of channels.

In this document, the terms "computer program medium" and "computer usable medium" are used generally to refer to media such as removable storage drive 2014, a hard disk installed in hard disk drive 2012, and signals 2028. These computer program products are means for providing software to computer system 2000.

Computer programs (also called computer control logic) are stored in main memory 2008 and/or secondary memory 2010. Computer programs may also be received via communication interface 2024. Such computer programs, when executed, enable the computer system 2000 to implement the present invention as discussed herein. Accordingly, such computer programs represent controllers of the computer system 2000. Where the invention is implemented using software, the software may be stored in a computer program product and loaded into computer system 2000 using removable storage drive 2014, hard disk drive 2012, or communication interface 2024, to provide some examples.

In alternative embodiments, the invention can be implemented as control logic in hardware, firmware, or software or any combination thereof.

The embodiments above are described by way of example, and are not intended to limit the scope of the invention. Various alternatives may be envisaged which nevertheless fall within the scope of the claims. As will be apparent from the above discussion, the method can be performed using a 2D image having a single CT slice, or a 3D image having consecutive CT slices.

CONCLUSION

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above described exemplary embodiments, but should be defined only in accordance with the following claims and their equivalents.

What is claimed is:

1. A method executing on a computing device for identifying a junction between a lesion and a wall adjacent an internal space in a computed tomography (CT) scan image, comprising:
    receiving, as input to the computing device, the CT scan image and first and second seed points at opposing sides of the lesion in the CT scan image;
    determining a boundary of the wall adjacent the internal space in the CT scan image;
    determining critical points along the boundary; and
    selecting first and second junction points on the boundary at the opposing sides of the lesion, including computing distance measured along the boundary from each of the first and second seed points to the critical points along the boundary, selecting first and second ones of the critical points along the boundary respectively having a shortest distance measured along the boundary to the first and second seed points at the opposing sides of the lesion, and selecting the first and second ones of the critical points as the first and second junction points, respectively, wherein the first and second junction points identify the junction between the lesion and the wall.

2. The method of claim 1, wherein said determining critical points includes determining at least one point of maximum curvature along the boundary.

3. The method of claim 1, wherein said determining critical points includes determining at least one point of transition between a straight portion of the boundary and a curved portion of the boundary.

4. The method of claim 1, further comprising moving the first and second seed points to the boundary prior to said computing a distance measured along the boundary between each of the first and second seed points and the critical points along the boundary.

5. The method of claim 4, further comprising determining if one of the first and second seed points is located in the internal space and, if so, said moving the first and second seed points includes moving said one of the first and second seed points to the boundary in a direction toward the other one of the first and second seed points.

6. The method of claim 4, further comprising determining if one of the first and second seed points is located within the wall and, if so, said moving the first and second seed points includes moving said one of the first and second seed points to the boundary such that an angle of rotation of a line between the first and second seed points is limited.

7. The method of claim 4, further comprising determining if one of the first and second seed points is located at a location within the wall and a distance between the location and the boundary is less than a predetermined threshold and, if so, said moving the first and second seed points includes moving said one of the first and second seed points to the boundary.

8. The method of claim 1, further comprising, for each of the first and second seed points, identifying a closest critical point in each direction along the boundary, and selecting the closer of the closest critical points as the corresponding junction point if the respective distances measured along the boundary to the closest critical points in each direction satisfy a predetermined criterion.

9. The method of claim 1, further comprising determining if a line between the first and second junction points intersects the boundary and, if so, moving the first and/or second junction points toward one another along the boundary until the line between the first and second junction points no longer intersects the boundary.

10. The method of claim 1, further comprising determining if a line between the first and second junction points is beyond the lesion and, if so, moving the first and second junction points toward one another along the boundary until the line between the first and second junction points intersects the lesion but does not intersect the boundary.

11. The method of claim 1, wherein said determining a boundary, determining critical points, and selecting first and second junction points are performed on each slice of a sequential plurality of slices of the CT scan image, and wherein the method further comprises using the first and second junction points of one slice of the plurality of slices to generate first and second seed points of an adjacent slice of the plurality of slices.

12. The method of claim 11, wherein said determining a boundary, determining critical points, and selecting first and second junction points are performed on each slice of a sequential plurality of slices of the CT scan image starting at a predetermined starting slice and proceeding in either direction from the starting slice until an end of the lesion is detected.

13. The method of claim 12, further comprising detecting the end of the lesion in response to a failure to detect the lesion between the first and second seed points in a slice.

14. The method of claim 12, further comprising, for each of the sequential plurality of slices, detecting an extent of the lesion wherein said detecting the end of the lesion comprises determining if the extent of the lesion detected in a slice does not overlap the extent of the lesion detected in an adjacent slice.

15. The method of claim 1, further comprising defining the junction between the lesion and the wall by a junction line extending between the first and second junction points, and determining an extent of the lesion limited by the junction line.

16. The method of claim 15, wherein said determining the extent of the lesion comprises segmenting the CT scan image and performing region-growing, limited by the junction line.

17. The method of claim 16, further comprising determining if the first and second junction points are not joined by the boundary and, if so, limiting the extent of the lesion by a boundary connecting line joining separate sections of the boundary on which the first and second junction points are located.

18. The method of claim 17, further comprising defining the boundary connecting line by determining a variation of distance between the separate sections of the boundary, and identifying a line at which a rate of change of the variation of distance is a maximum.

19. The method of claim 15, wherein said determining the extent of the lesion comprises:
performing fine segmentation to separate at least a portion of the CT scan image around the lesion into foreground and background, using a threshold based on local contrast;
identifying a connected foreground region representing the lesion, limited by the junction line;
expanding the foreground region to include background points and excluding foreground points not included within the foreground region, to create a mask;
deriving a fuzzy connectivity map defining connectivity of points within the mask to a seed point within the lesion; and
determining the extent of the lesion based on the fuzzy connectivity map.

20. The method of claim 19, wherein said determining the extent of the lesion based on the fuzzy connectivity map comprises growing a connectivity region from the seed point within the fuzzy connectivity map and outputting the region having the highest boundary contrast as the extent of the lesion.

21. The method of claim 1, wherein the lesion is a nodule and the internal space is a lung.

22. The method of claim 1, wherein the lesion is a polyp and the internal space is a colon.

23. A method executing on a computing device for identifying an extent of a lesion attached to a wall in a computed tomography (CT) scan image, comprising:
identifying a junction between the lesion and the wall in the CT scan image;
performing fine segmentation to separate at least a portion of the CT scan image around the lesion into foreground and background, using a threshold based on local contrast;
growing a foreground region representing the lesion, limited by the junction;
expanding the foreground region to include background points while excluding foreground points not included within the foreground region, to create a mask;
deriving a fuzzy connectivity map defining connectivity of points within the mask to a seed point within the lesion; and
determining the extent of the lesion based on the fuzzy connectivity map.

24. The method of claim 23, wherein said determining the extent of the lesion comprises growing a connectivity region from the seed point within the fuzzy connectivity map, and outputting the region having the highest boundary contrast as the extent of the lesion.

25. The method of claim 23, wherein the lesion is a nodule and the internal space is a lung.

26. The method of claim 23, wherein the lesion is a polyp and the internal space is a colon.

27. A computer-readable storage medium having stored thereon computer executable instructions that, if executed by a computing device, cause the computing device to perform a method for identifying a junction between a lesion and a wall adjacent an internal space in a computed tomography (CT) scan image, the method comprising:
receiving as input the CT scan image and first and second seed points at opposing sides of the lesion in the CT scan image;
determining a boundary of the wall adjacent the internal space in the CT scan image;
determining critical points along the boundary; and
selecting first and second junction points on the boundary at the opposing sides of the lesion, including measuring a distance along the boundary from each of the first and second seed points to the critical points along the boundary, selecting first and second ones of the critical points along the boundary respectively having a shortest distance measured along the boundary to the first and second seed points on opposing sides of the lesion, and selecting the first and second ones of the critical points as the first and second junction points, respectively, wherein the first and second junction points identify the junction between the lesion and the wall.

28. A computer-readable storage medium having stored thereon computer executable instructions that, if executed by a computing device, cause the computing device to perform a method for identifying an extent of a lesion attached to a wall in a computed tomography (CT) scan image, the method comprising:
identifying a junction between the lesion and the wall in the CT scan image;
performing fine segmentation to separate at least a portion of the CT scan image around the lesion into foreground and background, using a threshold based on local contrast;
growing a foreground region representing the lesion, limited by the junction;
expanding the foreground region to include background points while excluding foreground points not included within the foreground region, to create a mask;
deriving a fuzzy connectivity map defining connectivity of points within the mask to a seed point within the lesion; and
determining an extent of the lesion based on the fuzzy connectivity map.

29. A system to identify a junction between a lesion and a wall adjacent an internal space in a computed tomography (CT) scan image, the system comprising:
means for receiving as input the CT scan image and first and second seed points at opposing sides of the lesion in the CT scan image;
means for determining a boundary of the wall adjacent the internal space in the CT scan image;
means for determining critical points along the boundary; and
means for selecting first and second junction points on the boundary at the opposing sides of the lesion, including measuring a distance along the boundary from each of the first and second seed points to the critical points along the boundary, selecting first and second ones of the critical points along the boundary respectively having a shortest distance measured along the boundary to the first and second seed points on the opposing sides of the lesion, and selecting the first and second ones of the critical points as the first and second junction points, respectively, wherein the first and second junction points identify the junction between the lesion and the wall.

* * * * *